United States Patent
Hsu

(10) Patent No.: US 11,228,756 B2
(45) Date of Patent: Jan. 18, 2022

(54) METHOD AND APPARATUS OF IMPLICIT INTRA CODING TOOL SETTINGS WITH INTRA DIRECTIONAL PREDICTION MODES FOR VIDEO CODING

(71) Applicant: MEDIATEK INC., Hsinchu (TW)

(72) Inventor: Chih-Wei Hsu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/491,616

(22) PCT Filed: Mar. 9, 2018

(86) PCT No.: PCT/CN2018/078560
§ 371 (c)(1),
(2) Date: Sep. 6, 2019

(87) PCT Pub. No.: WO2018/161954
PCT Pub. Date: Sep. 13, 2018

(65) Prior Publication Data
US 2020/0382772 A1    Dec. 3, 2020

Related U.S. Application Data

(60) Provisional application No. 62/469,562, filed on Mar. 10, 2017.

(51) Int. Cl.
*H04N 19/11* (2014.01)
*H04N 19/12* (2014.01)
(Continued)

(52) U.S. Cl.
CPC ............ *H04N 19/11* (2014.11); *H04N 19/12* (2014.11); *H04N 19/159* (2014.11); *H04N 19/176* (2014.11); *H04N 19/593* (2014.11)

(58) Field of Classification Search
None
See application file for complete search history.

(56) References Cited

U.S. PATENT DOCUMENTS

| 9,699,466 B2 | 7/2017 | Wu et al. |
| 2005/0232497 A1 | 10/2005 | Yogeshwar et al. |

(Continued)

FOREIGN PATENT DOCUMENTS

| CN | 104754337 A | 7/2015 |
| CN | 105578181 A | 5/2016 |

(Continued)

OTHER PUBLICATIONS

International Search Report dated May 4, 2018, issued in application No. PCT/CN2018/078560.
Xu, X., et al.; "Predictive Coding of Intra Prediction Modes for High Efficiency Video Coding;" May 2012; pp. 1-5.

(Continued)

*Primary Examiner* — Kate H Luo
(74) *Attorney, Agent, or Firm* — Oblon, McClelland, Maier & Neustadt, L.L.P.

(57) ABSTRACT

Method and apparatus for video encoding or decoding performed by a video encoder or a video decoder incorporating a coding tool for Intra prediction with multiple directional Intra prediction modes are disclosed. According to the present invention, one or more coding tool settings are determined based on the Intra prediction mode when the Intra prediction mode is a directional mode so that there is no need for explicitly signalling said one or more coding tool settings determined based on the Intra prediction mode. At the encoder side, the Intra prediction and the coding tool are applied to the current block to generate Intra prediction residues or transformed Intra prediction residues for the current block.

19 Claims, 6 Drawing Sheets

(51) Int. Cl.
*H04N 19/159* (2014.01)
*H04N 19/176* (2014.01)
*H04N 19/593* (2014.01)

(56) References Cited

U.S. PATENT DOCUMENTS

| | | |
|---|---|---|
| 2012/0057630 A1 | 3/2012 | Saxena et al. |
| 2015/0208090 A1* | 7/2015 | Sakakibara ............ H04N 19/11 375/240.12 |
| 2016/0080751 A1 | 3/2016 | Xiu et al. |
| 2016/0198190 A1 | 7/2016 | Budagavi |
| 2017/0094285 A1* | 3/2017 | Said .................... H04N 19/157 |
| 2017/0150183 A1* | 5/2017 | Zhang ................. H04N 19/587 |
| 2019/0052878 A1* | 2/2019 | Zhao ................... H04N 19/159 |

FOREIGN PATENT DOCUMENTS

| | | |
|---|---|---|
| TW | 201613352 A | 4/2016 |
| WO | 2012/121744 A1 | 9/2012 |

OTHER PUBLICATIONS

Canadian Office Action dated Jun. 29, 2021 in Canadian Patent Application No. 3,055,804, 5 pages.
Chen et al., "Algorithm description of Joint Exploration Test Model 5 (JEM5)" (published on Feb. 13, 2017).
Alshina E et al., "Exploration Experiments on Coding Tools Report" (published on Mar. 31, 2017).
Seregin V et al., "Non-EE1: PDPC without a mode flag" (published on Jul. 8, 2017).
European Search Report, dated Sep. 17, 2020, in application No. 18764655.9-1208/3590256 PCT/CN2018078560.

* cited by examiner

METHOD AND APPARATUS OF IMPLICIT INTRA CODING TOOL SETTINGS WITH INTRA DIRECTIONAL PREDICTION MODES FOR VIDEO CODING

CROSS REFERENCE TO RELATED APPLICATIONS

The present invention claims priority to U.S. Provisional Patent Application, Ser. No. 62/469,562, filed on Mar. 10, 2017. The U.S. Provisional Patent Application is hereby incorporated by reference in its entirety.

FIELD OF THE INVENTION

The invention relates generally to video coding incorporating Intra prediction. In particular, the present invention relates to techniques to improve coding efficiency or reduce complexity for video coding systems using PDPC (Position Dependent Intra Prediction Combination) or ARSS (Adaptive Reference Sample Smoothing), or AMT (Adaptive Multiple Transforms) coding tool with Intra prediction.

BACKGROUND AND RELATED ART

The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC).

In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A quadtree, denoted as the coding tree, is used to partition the CTU into multiple CUs. Let CTU size be M×M, where M is one of the values of 64, 32, or 16. The CTU can be a single CU or can be split into four smaller units of equal sizes (i.e., M/2×M/2), which are nodes of coding tree. If units are leaf nodes of coding tree, the units become CUs. Otherwise, the quadtree splitting process can be iterated until the size for a node reaches a minimum allowed CU size as specified in the SPS. This representation results in a recursive structure as specified by a coding tree (also referred to as a partition tree structure) 120 in FIG. 1. The CTU partition 110 is shown in FIG. 1, where the solid lines indicate CU boundaries. The decision whether to code a picture area using Inter-picture (temporal) or Intra-picture (spatial) prediction is made at the CU level. Since the minimum CU size can be 8×8, the minimum granularity for switching between different basic prediction types is 8×8.

One or more prediction units (PU) are specified for each CU. Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU as shown in FIG. 2. Unlike the CU, the PU may only be split once. The partitions shown in the second row correspond to asymmetric partitions, where the two partitioned parts have different sizes.

After obtaining the residual block by applying the prediction process based on the PU splitting type, a CU can be partitioned into transform units (TUs) according to another quadtree structure, which is analogous to the coding tree for the CU. In FIG. 1, the solid lines in block 110 indicate CU boundaries, and dotted lines in block 110 indicate TU boundaries. Similarly, the solid lines for the partition tree structure 120 corresponds to the CU partition tree structure and the dashed lines for the partition tree structure 120 corresponds to the TU partition tree structure. The TU is a basic representative block of residual or transform coefficients for applying the integer transform and quantization. For each TU, one integer transform with the same size is applied to the TU to obtain residual coefficients. These coefficients are transmitted to the decoder after quantization on a TU basis.

The terms, coding tree block (CTB), coding block (CB), prediction block (PB), and transform block (TB) are defined to specify the 2-D sample array of one colour component associated with CTU, CU, PU, and TU, respectively. Thus, a CTU consists of one luma CTB, two chroma CTBs, and associated syntax elements. A similar relationship is valid for CU, PU, and TU. The tree partitioning is generally applied simultaneously to both luma and chroma, although exceptions apply when certain minimum sizes are reached for chroma.

Alternatively, a binary tree block partitioning structure can be used as disclosed in ITU-T SG 16 (Study Period 2013), Contribution 966 (J. An, et al, "Block partitioning structure for next generation video coding", ITU-T T13 SG16 COM 16-C 966 R3-E, Geneva, September 2015). In the disclosed binary tree partitioning structure, a block can be recursively split into two smaller blocks. There are several splitting types as shown in FIG. 3. The most efficient and simplest ones are the symmetric horizontal and vertical splits as shown in the top two splitting types in FIG. 3. Therefore, a system may choose to only use these two splitting types. For a given block of size M×M, a flag can be signalled to indicate whether to split a block into two smaller blocks. If the flag indicates "yes", another syntax element is signalled to indicate which splitting type is used (i.e., horizontal or vertical). If the horizontal splitting is used then it is split into two blocks of size M×M/2, otherwise if the vertical splitting is used then it is split into two blocks of size M/2×M. The binary tree splitting process can be iterated until the size (width or height) for a splitting block reaches a minimum allowed block size (width or height) that can be defined in high level syntax such as SPS (sequence parameter set). Since the binary tree has two splitting types (i.e., horizontal and vertical), the minimum allowed block width and height should be both indicated. Non-horizontal splitting is implicit when the splitting would result in a block height smaller than the indicated minimum. Non-vertical splitting is implicit when splitting would result in a block width smaller than the indicated minimum. FIG. 4 illustrates an example of block partitioning 410 and its corresponding binary tree structure 420. In each splitting (i.e., non-leaf) node of the binary tree, one flag indicates which splitting type (horizontal or vertical) is used, 0 indicates horizontal splitting and 1 indicates vertical splitting.

The proposed binary tree structure can be used for partitioning a block into multiple smaller blocks such as partitioning a slice into CTUs, a CTU into CUs, a CU into PUs, or a CU into TUs, and so on. In one embodiment, the binary tree is used for partitioning a CTU into CUs. In other words, the root node of the binary tree is a CTU and the leaf nodes of the binary tree are CUs. The leaf nodes are further processed by prediction and transform coding. In another embodiment, there is no further partitioning from CU to PU or from CU to TU to simplify the block partitioning process. That means the CU is equal to the PU and also equal to TU. Therefore, the leaf nodes of the binary tree are also the basic unit for prediction and transform coding in this case.

Binary tree structure is more flexible than quadtree structure, since much more partition shapes can be supported, which is also a factor for coding efficiency improvement. However, the encoding complexity will also increase in order to select the best partition shape. In order to balance the complexity and coding efficiency, a method to combine the quadtree and binary tree structure has been adopted in JVET-E1001 (Chen et al., "*Algorithm Description of Joint Exploration Test Model 5 (JEM 5)*", Joint Collaborative Team on Video Coding of ITU-T SG16 WP3 and ISO/IEC JTC1/SC29/WG11, 5th Meeting: Geneva, CH, 12-20 Jan. 2017, Document: JVET-E1001), which is called quadtree plus binary tree (QTBT) structure. In the disclosed QTBT structure, a block is firstly partitioned by a quadtree structure, the quadtree splitting can be iterated until the size for a splitting block reaches the minimum allowed quadtree leaf node size. If the leaf quadtree block is not larger than the maximum allowed binary tree root node size, it can be further partitioned by a binary tree structure, the binary tree splitting can be iterated until the size (width or height) for a splitting block reaches the minimum allowed binary tree leaf node size (width or height) or the binary tree depth reaches the maximum allowed binary tree depth. In the QTBT structure, the minimum allowed quadtree leaf node size, the maximum allowed binary tree root node size, the minimum allowed binary tree leaf node width and height, and the maximum allowed binary tree depth can be indicated in the high level syntax such as in SPS. FIG. 5 illustrates an example of block partitioning 510 and its corresponding QTBT structure 520. The solid lines indicate quadtree splitting and dotted lines indicate binary tree splitting. In each splitting (i.e., non-leaf) node of the binary tree, one flag indicates which splitting type (horizontal or vertical) is used, 0 indicates horizontal splitting and 1 indicates vertical splitting.

The disclosed QTBT structure can be used for partitioning a block into multiple smaller blocks such as partitioning a slice into CTUs, a CTU into CUs, a CU into PUs, or a CU into TUs, and so on. For example, the QTBT can be used for partitioning a CTU into CUs, i.e., the root node of the QTBT is a CTU, which is partitioned into multiple CUs by a QTBT structure. The CUs are further processed by prediction and transform coding. Simplification of the QTBT structure has been also disclosed in PCT/CN2015/096761, filed on Dec. 9, 2015, where no further partitioning is applied from CU to PU or from CU to TU. In other words, a CU is equal to a PU and is also equal to a TU. Therefore, the leaf node of the QTBT structure is the basic unit for prediction as well as for transform.

In HEVC, Intra Prediction mode supports 35 different prediction modes corresponding to DC and Planar modes and other 33 directional prediction modes. After prediction, the predicted residues for one CU are divided into transform units (TUs) and each TU is processed using transform and quantization. HEVC adopts Discrete Cosine Transform type II (DCT-II) as its core transform due to its strong "energy compaction" property.

For the next generation Video Coding standard (i.e., Joint Exploration Model (JEM)) being developed under Joint Video Exploration Team (JVET) of ITU-T SG 16 WP 3 and ISO/IEC JTC 1/SC 29/WG 11, the 33 directional prediction modes are extended to directional prediction modes are used. The more directional prediction modes allow capturing finer edge directions presented in natural videos. The new directional modes are shown in dotted arrows in between every two neighbouring directional modes of the original 33 modes, which are shown in solid arrows in FIG. 6. The Planar and DC modes remain the same. These denser directional Intra prediction modes can be applied to all block sizes for both luma and chroma Intra predictions.

Besides more directional Intra prediction modes, the next generation coding being developed also support some other Intra coding tools to improve the prediction quality for the Intra Prediction mode. For example in JVET-D1001 (Chen et al., "*Algorithm Description of Joint Exploration Test Model 4 (JEW 4)*", Joint Collaborative Team on Video Coding of ITU-T SG16 WP3 and ISO/IEC JTC1/SC29/WG11, 4th Meeting: Chengdu, CN, 15-21 Oct. 2016, Document: JVET-D1001), position dependent Intra prediction combination (PDPC) is disclosed as a post-processing method for Intra prediction, which invokes combination of HEVC Intra prediction with un-filtered boundary reference samples. FIG. 7 illustrates an example of Intra prediction in 4×4 blocks according to HEVC and the PDPC. The new prediction p[x,y] combines weighted values of boundary elements with the HEVC prediction q[x,y] as following:

$$p[x,y]=\{(c_1^{(v)}>>\lfloor y/d_y\rfloor)r[x,-1]-(c_2^{(v)}>>\lfloor y/d_y\rfloor)r[-1,-1]+(c_1^{(h)}>>\lfloor x/d_x\rfloor)r[-1,y]-(c_2^{(h)}>>\lfloor x/d_x\rfloor)r[-1,-1]+b[x,y]q[x,y]+64\}>>7. \quad (1)$$

In the above equation, r and s represents the boundary samples with unfiltered and filtered references, respectively. The HEVC Intra prediction (i.e., q[x,y]) is based on filtered reference s. The x and y are the horizontal and vertical distance from the block boundary. Furthermore, $c_1^v$, $c_2^v$, $c_1^h$, $c_2^h$ are stored prediction parameters, $d_x$=1 for blocks with width smaller than or equal to 16 and $d_x$=2 for blocks with width larger than 16, $d_y$=1 for blocks with height smaller than or equal to 16 and $d_y$=2 for blocks with height larger than 16. b[x, y] is a normalization factor derived as follow:

$$[x,y]=128-(c_1^{(v)}>>\lfloor y/d_y\rfloor)+(c_2^{(v)}>>\lfloor y/d_y\rfloor)-(c_1^{(h)}>>\lfloor x/d_x\rfloor)+(c_2^{(h)}>>\lfloor X/d_x\rfloor) \quad (2)$$

In JVET-D1001, a set of 7-tap low pass filters is used to smooth the boundary samples, where the impulse response of a filter k is designated as $h_k$ and an additional stored parameter a for computing the filtered reference as in equation (3).

$$s=ar+(1-a)(h_k*r) \quad (3)$$

where "*" represents convolution.

According to JVET-D1001, one set of prediction parameters ($c_1^v$, $c_2^v$, $c_1^h$, $c_2^h$, a and filter index k) is defined per Intra prediction mode and block size, where neighbouring prediction directions are grouped. A CU level flag is signalled to indicate whether PDPC is applied or not. Value 0 indicates that the existing HEVC Intra prediction (with HEVC reference sample smoothing filter disabled) is used, and values 1 indicates the PDPC is applied. When PDPC flag value is equal to 0, the adaptive reference sample smoothing method mentioned as described below is applied to generate Intra prediction.

At encoder side, the PDPC flag for an Intra-coded CU is determined at CU level. When Intra mode rate-distortion (RD) cost check is needed for a CU, one additional CU level RD check is added to select the optimal PDPC flag between the value of 0 and 1 for an Intra-coded CU.

Adaptive reference sample smoothing (ARSS) is another coding tool for Intra prediction adopted in JVET-D1001, where a new reference sample filtering mechanism is introduced by using two low pass filters (LPF) to process reference samples:

3-tap LPF with the coefficients of [1, 2, 1]/4
5-tap LPF with the coefficients of [2, 3, 6, 3, 2]/16

The ARSS coding tool goes through a set of decision to determine filter process for reference sampling, which selects no filter, HEVC filter, the 3-tap LPF or the 5-tap LPF.

ARSS need to signal the selected filter option. In JVET-D1001, data hiding is used instead of signalling the flag in the bitstream. In HEVC, the sign of the last coefficient of a coefficients group (CG) is hidden in the sum of the absolute values of the CG's coefficients. In JEM (i.e., Joint Exploration Test Model (JEM) software for the next generating video coding being developed under JVET), a similar technique is used to hide the filtering flag that indicates what of the two filters related to the same filter set and selected in accordance with block size and Intra prediction mode. The transform coefficients of a given coding block that are located at an odd position are used to hide the value of the filtering flag.

In JVET-D1001, ARSS is applied only for the luma component. In case that CU size is smaller than or equal to 1024 luma samples and larger than or equal to 64 luma samples, at least one coefficient sub-group in the Luma coding block has a sign bit hidden and the Intra prediction mode is not DC mode. The condition of reference samples smoothing has been modified for luminance component compared to HEVC: the threshold of angle between Intra mode and the closest horizontal or vertical axis has been reduced by 2. The selection rules for 4-taps Intra interpolation filer has been also modified for the luma component: cubic Intra-interpolation is used for coding block with all sizes.

In JEM, when PDPC flag is equal to 1 for a CU, ARSS is disabled in this CU.

To select optimal ARSS flag value for a coding block, two rounds of RD cost checks are needed at encoder-side: one with ARSS flag set equal to zero and the other with it set equal to one. In JEM software, the following fast encoder mechanism is used to simplify the ARSS computational complexity at the encoder side.

When CBF equal to 0 for default reference sample smoothing (i.e. ARSS flag is zero), the RD-cost check is skipped for the case of ARSS flag equal to one.

ARSS flag hiding is combined with sign hiding at the encoder side. It is noteworthy that coefficients adjustment for sign hiding and for ARSS flag hiding is not a separate step. Both bits hiding are performed jointly within a single step (i.e., "hiding procedure"). Encoder selects coefficients to modify with respect to both sign hiding and ARSS flag hiding checksum values. Coefficients at both odd positions or at even positions are adjusted. Hence, it makes possible to provide the desired combination of sign hiding and ARSS flag hiding checksum values.

In JVET-D1001, an Enhanced Multiple Transform (EMT) scheme is used for residual coding for both Intra and Inter-coded blocks. In the literature, the EMT may also be referred as Adaptive Multiple Transform (AMT). It utilizes multiple selected transforms from the DCT/DST families other than the current transforms in HEVC. The newly introduced transform matrices are DST-VII, DCT-VIII, DST-I and DCT-V. Table 1 summarizes the transform basis functions of each transform for N-point input.

TABLE 1

Transform basis functions for N-point input

| Transform Type | Basis function $T_i(j)$, $i, j = 0, 1, \ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ where $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{\pi \cdot i \cdot (2j+1)}{2N-1}\right)$, where $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{2N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{2}{2N+1}} \cdot \sin\left(\dfrac{\pi \cdot (2i+1) \cdot (j+1)}{2N+1}\right)$ |

According to EMT, multiple transforms can be selected for one TU. For example, for Inter CUs, one EMT flag can be coded to indicate that the HEVC transform is used (i.e., EMT flag equal to zero) or one of the new multiple transforms is used (i.e., EMT flag equal to one). When EMT flag is equal to one, there are two kinds of different transforms in horizontal and vertical directions, respectively. An EMT index may be used to indicate the transform selected for each of the horizontal and vertical directions. Overall, four different transforms are supported for each CU when EMT flag is one. For Intra CUs, there are also four candidates in multiple transforms. However, these four candidates are variants according to Intra prediction direction.

When new coding tools are developed and used with the Intra prediction mode, explicit signalling may be needed. For example, one bit flag is required for PDPC and ARSS to signal whether it is turned on or off. For AMT, multiple flags are required for signalling the corresponding multiple transforms being used. For encoder, it also implies multiple trials (i.e., RD checks) to select the best modes or transforms, which in turn increases the encoder complexity.

BRIEF SUMMARY OF THE INVENTION

Method and apparatus for video encoding or decoding performed by a video encoder or a video decoder incorporating a coding tool for Intra prediction with multiple directional Intra prediction modes are disclosed. According to the present invention, one or more target settings for the coding tool are determined based on the Intra prediction mode when the Intra prediction mode is a directional mode so that there is no need for explicitly signalling said one or more coding tool settings determined based on the Intra prediction mode. At the encoder side, the Intra prediction and the coding tool are applied to the current block to generate Intra prediction residues or transformed Intra prediction residues for the current block. At the decoder side, the Intra prediction and the coding tool are applied to the Intra prediction residues or transformed Intra prediction residues to generate a reconstructed current block. The Intra prediction is applied according to the current Intra prediction mode and the coding tool is applied according to said one or more target settings.

In one embodiment, the target settings for the coding tool correspond to a flag indicating the coding tool being on or off, where the flag is set to indicate the coding tool being on if the current Intra prediction mode is an even-numbered directional Intra prediction mode and the flag is set to indicate the coding tool being off if the current Intra prediction mode is an odd-numbered directional Intra prediction mode. In another embodiment, the coding tool on/off setting is set according to the even/odd numbered directional Intra prediction modes the opposite way. In yet another embodiment, the coding tool on/off setting depends on whether the current Intra prediction mode belongs to a mode group consisting of a predefined number of directional Intra prediction modes. In this case, the mode group can be determined according to a table consisting of the predefined number of directional Intra prediction modes or according to an equation.

In one embodiment, the coding tool corresponds to PDPC (Position Dependent Intra Prediction Combination) or ARSS (Adaptive Reference Sample Smoothing), where PDPC coding tool generates a combined Intra predictor by combining a first Intra predictor derived based on filtered boundary reference samples with un-filtered boundary reference samples and ARSS coding tool generates a target Intra predictor from boundary reference samples by applying no filter or applying one filter selecting from a set of filters to the boundary reference samples. Said one or more target settings correspond to a flag indicating the PDPC being on or off, indicating the ARSS being on or off, or an index indicating a selected ARSS filter when the ARSS is on. For PDPC and ARSS, the Intra prediction and the coding tool are applied to the current block to generate Intra prediction residues at the encoder side, or applied to the Intra prediction residues to generate reconstructed current block at the decoder side.

In another embodiment, the coding tool corresponds to AMT (Adaptive Multiple Transform), where AMT coding tool utilizes a second set of transforms different from a first set of transforms. In this case, said one or more target settings correspond to a flag indicating the AMT being on or off or an index indicating a target transform selected from the second set of transforms when the AMT is on. For the AMT coding tool, the Intra prediction according to the current Intra prediction mode is applied to the current block to generate the Intra prediction residues and the coding tool according to said one or more target settings is applied to the Intra prediction residues to generate the transformed Intra prediction residues at the encoder side. At the decoder side, the coding tool according to said one or more target settings is applied to the transformed Intra prediction residues to generate reconstructed Intra prediction residues, and the Intra prediction according to the current Intra prediction mode is applied to the reconstructed Intra prediction residues to generate the reconstructed current block.

In the case that said one or more target settings are determined based on said one or more coding parameters, said one or more coding parameters comprise current block size, current block width, current block height, quantization parameter associated with the current block, or slice type associated with the current block.

DETAILED DESCRIPTION OF THE INVENTION

Figure 1:
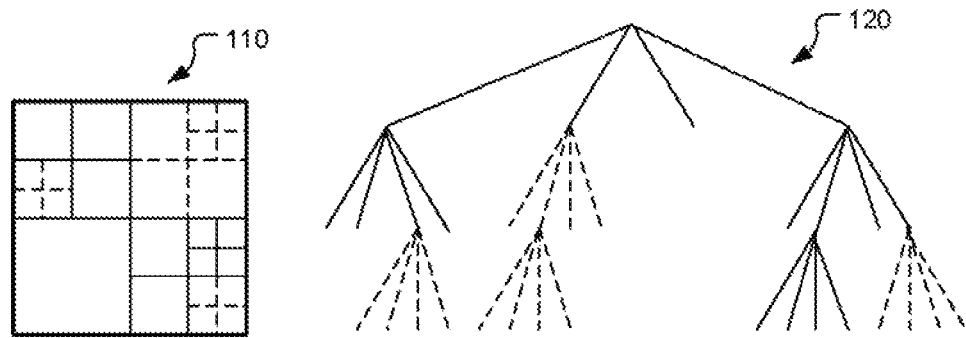
FIG. 1 illustrates the subdivision of a CTU into CUs and TUs using a corresponding quadtree in HEVC (high efficiency video coding).
Figure 2:
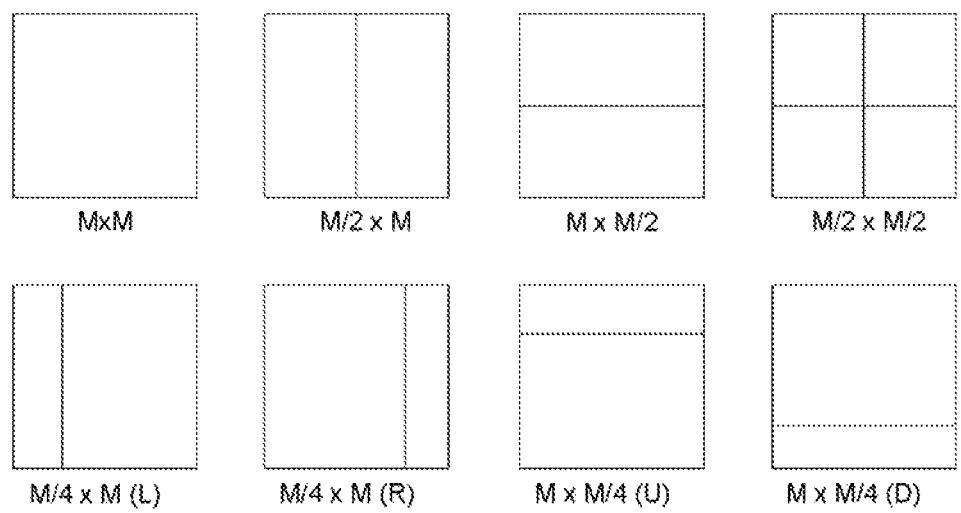
FIG. 2 illustrates the eight partition types for splitting a CU (coding unit) into one or more PUs (prediction units) in HEVC (high efficiency video coding).
Figure 3:
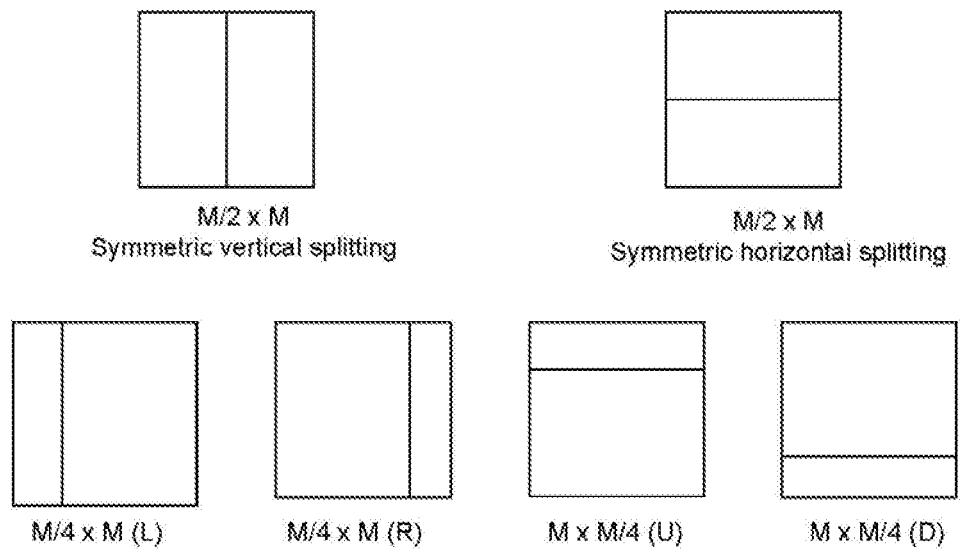
FIG. 3 illustrates the possible splitting types for a binary tree.
Figure 4:
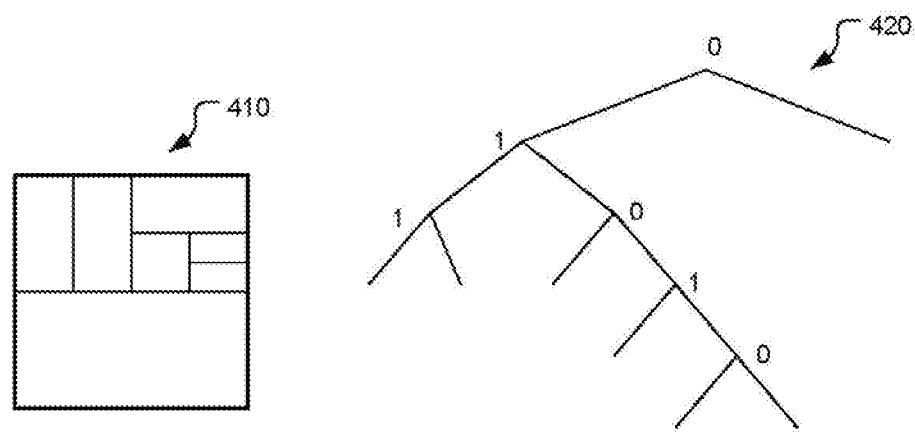
FIG. 4 illustrates an example of block partition using a corresponding binary tree.
Figure 5:
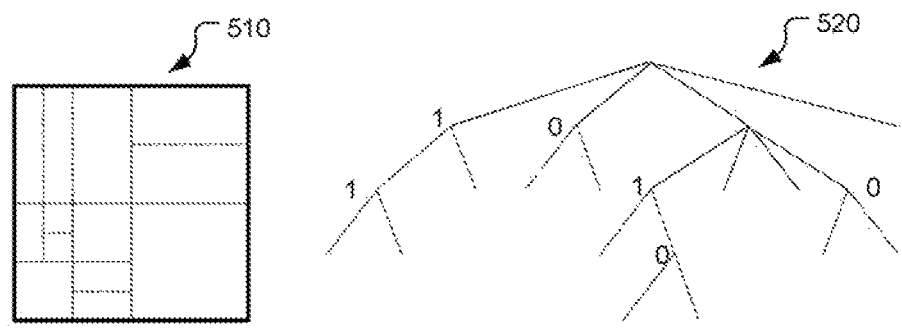
FIG. 5 illustrates an example of block partition using a corresponding quadtree plus binary tree (QTBT).
Figure 6:
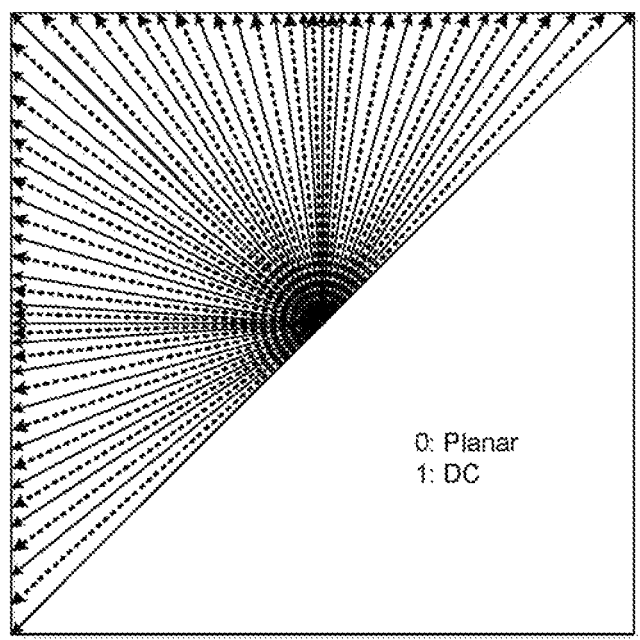
FIG. 6 illustrates the new directional Intra prediction modes that are shown in dotted arrows in between every two neighbouring directional modes of the original 33 directional Intra prediction modes as shown in solid arrows.
Figure 7:
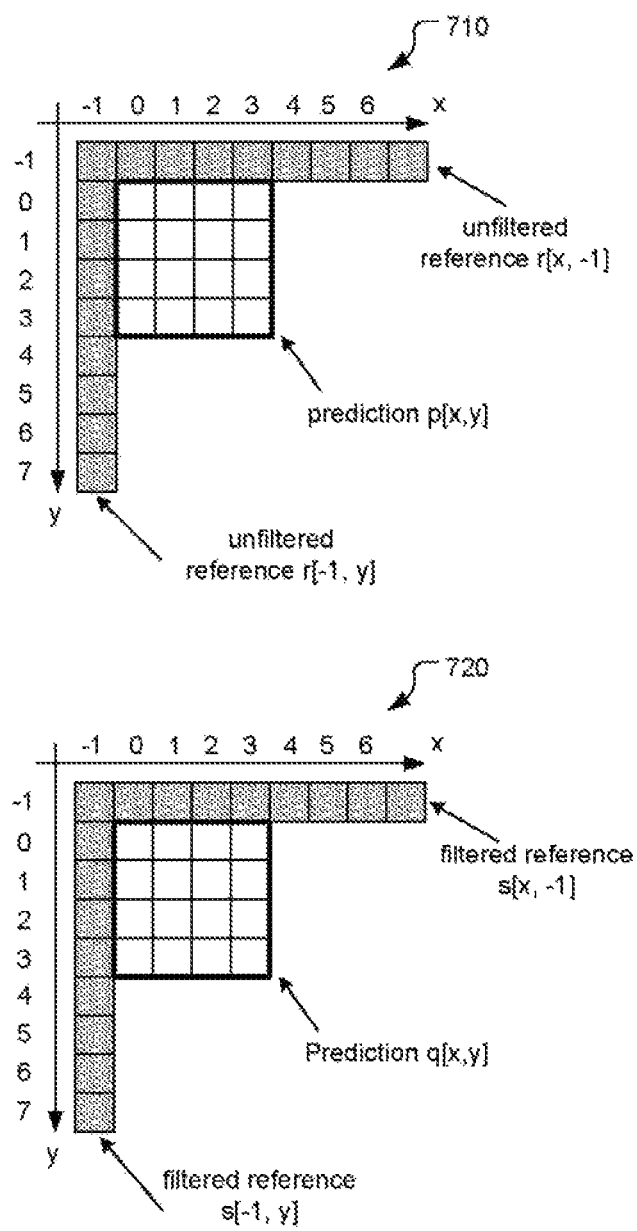
FIG. 7 illustrates an example of Intra prediction in 4×4 blocks according to HEVC Intra prediction and the PDPC (Position Dependent Intra Prediction Combination) Intra prediction.

The following description is of the best-contemplated mode of carrying out the invention. This description is made for the purpose of illustrating the general principles of the invention and should not be taken in a limiting sense. The scope of the invention is best determined by reference to the appended claims.

As mentioned before, several new coding tools, such as Position Dependent Intra Prediction Combination (PDPC), Adaptive Reference Sample Smoothing (ARSS) and Adaptive Multiple Transform (AMT) are introduced for Intra prediction incorporated in the next generation video coding. The use of these coding tools often involves signalling related to the coding tool settings, which will increase required bandwidth. The present invention is intended to improve the coding efficiency or reduce complexity for coding systems incorporating any of these coding tools with Intra prediction.

In this invention, the implicit signalling associated with coding tool setting is disclosed to replace the explicit indications according to the directional Intra prediction modes. The implicit signalling is useful especially for the case that the number of directions is getting large. In general, the finer the directional predictions are, the less difference between adjacent directional predictors has. Therefore, it is preferred to assign different settings of the coding tool to adjacent directional Intra prediction modes. For example, the different settings of the new tools may correspond to setting the coding tool on and off. In another example, the different settings of the new tools may correspond to selecting different transforms if the coding tool corresponds to the AMT. If the adjacent directional Intra prediction modes generate similar predictors, different tool settings can be tested. The different tool settings may cause more distinct coding results for adjacent directional Intra prediction modes, which creates opportunities for possible coding gain. With the implicit assignment, both the directional Intra prediction modes and coding tool settings can be signalled at the same time using the original signalling for the Intra mode coding. The present invention may also reduce the encoder complexity because when the directional modes are tested at the encoder, the different tool settings can be determined at the same time without the need for extra checking for different coding tool settings.

In one embodiment, when 65 (from 2 to 66) directional Intra prediction modes are used for Intra prediction and PDPC is also enabled, the present invention determines the PDPC setting (or called the target setting for PDPC) implicitly for directional Intra prediction modes. For example, the directional Intra prediction modes with even numbers (i.e., 2, 4, 6, . . . , 66) can be implicitly assigned with PDPC off while the directional Intra prediction modes with odd numbers (i.e., 3, 5, 7, . . . , 65) can be implicitly assigned with PDPC on. In another example, the PDPC on/off can also be assigned in the opposite way.

As is known in the field, when Intra prediction with the PDPC coding tool is applied to a current block at the encoder side, the Intra prediction according to a selected Intra prediction mode and the PDPC coding tool according to the target coding tool setting are applied to the current block to generate Intra prediction residues for the current block. According to the present invention, the target coding tool setting is determined based on the selected Intra prediction mode if the selected Intra prediction mode is a directional Intra prediction mode. Therefore, there is no need to signal target coding tool setting. At the decoder side, for an Intra-coded current block, the Intra prediction mode is determined, such as being decoded from a bitstream. According to the present invention, the target coding tool setting is determined based on the selected Intra prediction mode if the selected Intra prediction mode is a directional Intra prediction mode. Therefore, there is no need to parse target coding tool setting from the bitstream. Accordingly, the Intra prediction according to the determined Intra prediction mode and the coding tool according to the derived target coding tool setting are applied to the Intra prediction residues of the current block to generate the reconstructed current block.

In another embodiment, when 65 (from 2 to 66) directional Intra prediction modes are used for Intra prediction and PDPC is also enabled, a predetermined number of directional Intra prediction modes can be implicitly assigned with PDPC on while the rest directional Intra prediction modes can be implicitly assigned with PDPC off. The PDPC on/off can also be assigned in the opposite way. The predetermined directional Intra prediction modes can be specified by a table with fixed entries (e.g. {2, 18(Horizontal), 34(Diagonal), 50(Vertical), 66}) or specified by fixed equations. For example, the set of predetermined directional Intra prediction modes may correspond to {2, 18(Horizontal), 34(Diagonal), 50(Vertical), 66}+offset, where offset can be predetermined or adaptively decided. For example, if offset is equal to 1, the set of predetermined directional Intra prediction modes may correspond to {3, 19, 35, 51, 67}. In another example, the set of predetermined directional Intra prediction modes may correspond to {directional modes % N=n}, where N and n are predetermined and "%" corresponds to the modulo operation.

In yet another embodiment, when 65 (from 2 to 66) directional Intra prediction modes are used for Intra prediction and PDPC is also enabled, multiple implicit assignments can be combined to determine whether PDPC is turned on or off. For example, the case that the odd directional Intra prediction modes are implicitly assigned with the PDPC on and the case that a predetermined number of directional Intra prediction modes are implicitly assigned with PDPC on as described previously can be combined.

In yet another embodiment, when 65 (from 2 to 66) directional Intra prediction modes are used for Intra prediction and PDPC are also supported, the implicit assignments can be adaptively applied according to other available coding parameters, such as CU size, CU width, CU height, quantization parameter or slice type. For example, the odd-numbered directional Intra prediction mode assignment with PDPC on is only applied when the CU area is larger than a predetermined threshold. In addition, the implicit assignments can be enabled or disabled according to high level syntax, such as a flag in sequence, picture or slice header. The implicit assignment can be also used together with explicit signalling.

The various embodiments incorporating implicit assignment as mentioned above for the PDPC coding tool can be also used for the Adaptive Reference Sample Smoothing (ARSS) coding tool with directional Intra modes to determine the on/off selections or filters for ARSS.

As is known in the field, when Intra prediction with the ARSS coding tool is applied to a current block at the encoder side, the Intra prediction according to a selected Intra prediction mode and the ARSS coding tool according to the target coding tool setting are applied to the current block to generate Intra prediction residues for the current block. According to the present invention, one or more target coding tool settings are determined based on the selected Intra prediction mode if the selected Intra prediction mode is a directional Intra prediction mode. Therefore, there is no need to signal the coding tool settings. The target coding tool setting may correspond to a flag indicating the ARSS on or off. When ARSS is on, additional coding tool setting may be required, such as an index to indicate the selected filter for filtering the boundary reference samples. The index to indicate the selected filter may also be dependent from the directional Intra prediction mode. At the decoder side, for an Intra-coded current block, the Intra prediction mode is determined, such as being decoded from a bitstream. According to the present invention, one or more target coding tool settings can be determined based on the selected Intra prediction mode if the selected Intra prediction mode is a directional Intra prediction mode. Therefore, there is no need to parse target coding tool setting from the bitstream or less coding tool setting needs to be parsed. Accordingly, the Intra prediction according to the determined Intra prediction mode and the coding tool according to one or more derived target coding tool settings are applied to the Intra prediction residues of the current block to generate the reconstructed current block.

The various embodiments incorporating implicit assignment as mentioned above for the PDPC coding tool can be also used for the Adaptive Multiple Transform (AMT) coding tool with directional Intra modes to determine the selection of different transforms.

As is known in the field, when Intra prediction with the AMT coding tool is applied to a current block at the encoder side, the Intra prediction according to a selected Intra prediction mode is applied to the current block to generate Intra prediction residues. The AMT coding tool according to the target coding tool settings is applied to the Intra prediction residues to generate transformed Intra prediction residues for the current block. According to the present invention, one or more target coding tool settings can be determined based on the selected Intra prediction mode if the selected Intra prediction mode is a directional Intra prediction mode. Therefore, there is no need to signal target coding tool setting or less coding tool setting needs to be parsed. At the decoder side, for an Intra-coded current block, the Intra prediction mode is determined, such as being decoded from a bitstream. According to the present invention, one or more target coding tool settings are determined based on the selected Intra prediction mode if the selected Intra prediction mode is a directional Intra prediction mode. Therefore, there is no need to parse target coding tool setting from the bitstream less coding tool setting needs to be parsed. Accordingly, the Intra prediction according to the determined Intra prediction mode and the coding tool according to the derived target coding tool setting are applied to the Intra prediction residues of the current block to generate the reconstructed current block.

Implicit coding tool settings according to Directional Intra prediction modes have been disclosed as above for Position Dependent Intra Prediction Combination (PDPC), Adaptive Reference Sample Smoothing (ARSS) and Adaptive Multiple Transform (AMT). There specific coding tools for Intra prediction are used as examples for implicitly coding tool setting according to Directional Intra prediction modes. The implicit assignments can also be used for directional Intra modes and other coding tools to determine the tool settings for improving the coding performance associated with the Intra prediction.

Figure 8:
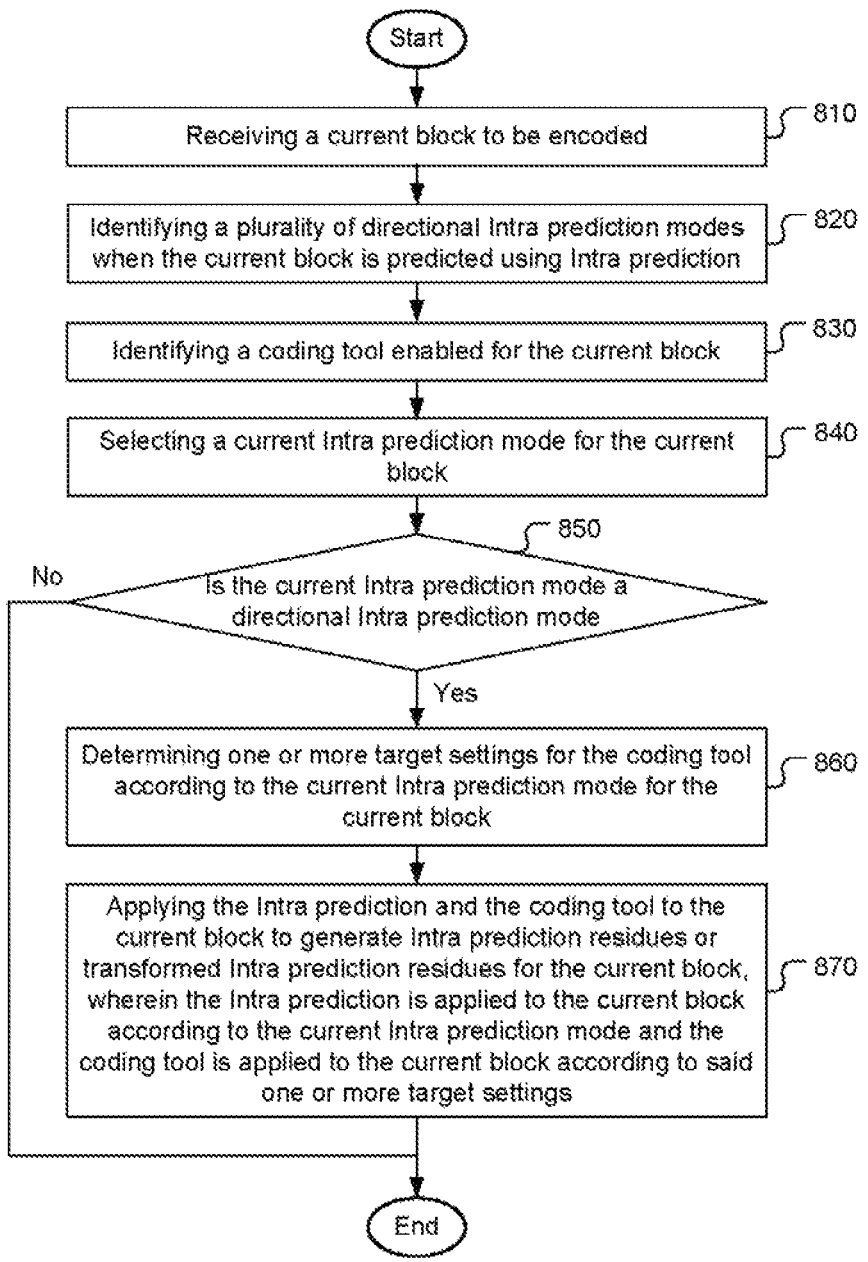
FIG. 8 illustrates a flowchart for an exemplary encoding system incorporating Intra prediction with a coding tool with coding tool setting dependent on the Intra prediction or one or more coding parameters according to a method of the present invention.

FIG. 8 illustrates a flowchart for an exemplary encoding system incorporating Intra prediction with a coding tool with coding tool setting dependent on the Intra prediction or one or more coding parameters according to a method of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, a current block to be encoded is received in step 810. A plurality of directional Intra prediction modes are identified when the current block is predicted using Intra prediction in step 820. Also, a coding tool enabled for the current block is identified in step 830. A current Intra prediction mode is selected for the current block in step 840. Whether the current Intra prediction mode is one directional Intra prediction mode is checked in step 850. If the current Intra prediction mode is one directional Intra prediction mode (i.e., the "yes" path from step 850), steps 860 and 870 are performed. Otherwise (i.e., the "no" path from step 850), steps 860 and 870 are skipped. In step 860, a target setting for the coding tool is determined according to the current Intra prediction mode for the current block. In step 870, the Intra prediction and the coding tool are applied to the current block to generate Intra prediction residues or transformed Intra prediction residues for the current block, wherein the Intra prediction is applied to the current block according to the current Intra prediction mode and the coding tool is applied to the current block according to the target setting.

Figure 9:
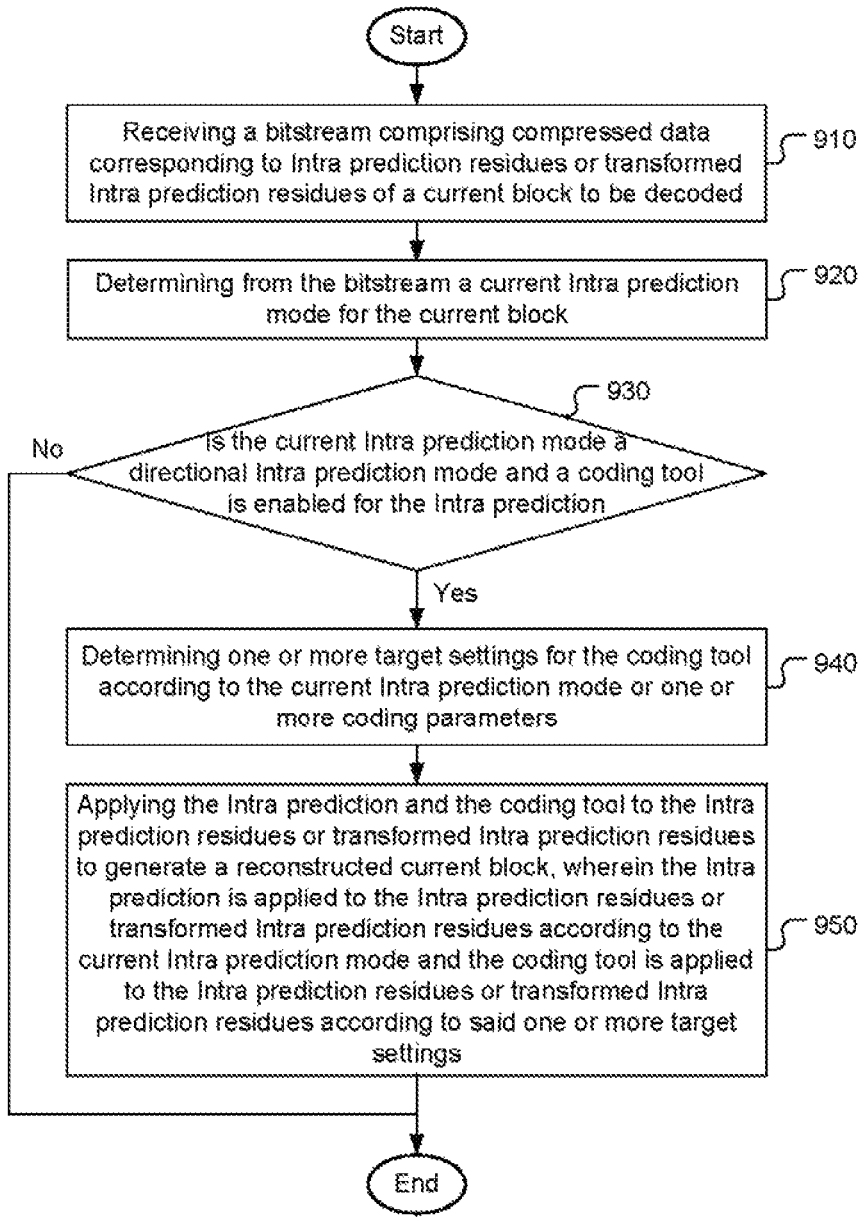
FIG. 9 illustrates a flowchart for an exemplary decoding system incorporating Intra prediction with a coding tool with coding tool setting dependent on the Intra prediction or one or more coding parameters according to a method of the present invention.

FIG. 9 illustrates a flowchart for an exemplary decoding system incorporating Intra prediction with a coding tool with coding tool setting dependent on the Intra prediction or one or more coding parameters according to a method of the present invention. A bitstream comprising compressed data corresponding to Intra prediction residues or transformed Intra prediction residues of a current block to be decoded is received in step 910. A current Intra prediction mode for the current block is determined from the bitstream in step 920. Whether the current Intra prediction mode is a directional Intra prediction mode and whether a coding tool is enabled for the Intra prediction are checked in step 930. If the current Intra prediction mode is a directional Intra prediction mode and the coding tool is enabled for the Intra prediction (i.e., the "yes" path in step 930), steps 940 and 950 are performed. Otherwise (i.e., the "no" path in step 930), steps 940 and 950 are skipped. In step 940, a target setting for the coding tool is determined according to the current Intra prediction mode or one or more coding parameters. In step 950, the Intra prediction and the coding tool are applied to the Intra prediction residues or transformed Intra prediction residues to generate a reconstructed current block, wherein the Intra prediction is applied to the Intra prediction residues or transformed Intra prediction residues according to the current Intra prediction mode and the coding tool is applied to the Intra prediction residues or transformed Intra prediction residues according to the target setting.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for decoding video data, the method comprising:
   receiving a bitstream comprising compressed data corresponding to Intra prediction residues or transformed Intra prediction residues of a current block to be decoded;
   determining from the bitstream a current Intra prediction mode for the current block; and
   if the current Intra prediction mode is a directional Intra prediction mode and a coding tool that corresponds to a PDPC (Position Dependent Intra Prediction Combination) is enabled for the Intra prediction:
      determining one or more target settings for the coding tool according to the current Intra prediction mode or one or more coding parameters, the one or more target settings corresponding to indicating PDPC being on or off; and
      applying the Intra prediction and the coding tool to the Intra prediction residues or transformed Intra prediction residues to generate a reconstructed current block, wherein the Intra prediction is applied to the Intra prediction residues or transformed Intra prediction residues according to the current Intra prediction mode and the coding tool is applied to the Intra prediction according to said one or more target settings,
      wherein said one or more target settings correspond to PDPC being on if the current Intra prediction mode is among a first group comprising several directional Intra prediction modes and said one or more target settings correspond to PDPC being off if the current Intra prediction mode is among a second croup comprising directional Intra prediction modes, wherein the first group comprising several directional Intra prediction modes is different from the second group comprising several directional Intra prediction modes.

2. The method of claim 1, wherein said one or more target settings correspond to a flag indicating the coding tool being on or off, and wherein the flag is set to indicate the coding tool being on if the current Intra prediction mode is an even-numbered directional Intra prediction mode and the flag is set to indicate the coding tool being off if the current Intra prediction mode is an odd-numbered directional Intra prediction mode.

3. The method of claim 1, wherein said one or more target settings correspond to a flag indicating the coding tool being on or off, and wherein the flag is set to indicate the coding tool being on if the current Intra prediction mode is an odd-numbered directional Intra prediction mode and the flag is set to indicate the coding tool being off if the current Intra prediction mode is an even-numbered directional Intra prediction mode.

4. The method of claim 1, wherein said one or more target settings correspond to a flag indicating the coding tool being on or off, and wherein the flag is set to indicate the coding tool being on if the current Intra prediction mode is one directional Intra prediction mode belonging to a mode group consisting of a predefined number of directional Intra prediction modes and the flag is set to indicate the coding tool being off if the current Intra prediction mode is one directional Intra prediction mode not belonging to the mode group.

5. The method of claim 4, Wherein the mode group is determined according to a table consisting of the predefined number of directional Intra prediction modes or according to an equation.

6. The method of claim 1, wherein PDPC coding tool generates a combined Intra predictor by combining a first Intra predictor derived based on filtered boundary reference samples with un-filtered boundary reference samples, and wherein the Intra prediction according to the current Intra prediction mode and the coding tool according to said one or more target settings are applied to the Intra prediction residues to generate the reconstructed current block.

7. The method of claim 1, and wherein the coding tool according to said one or more target settings is applied to the transformed Intra prediction residues to generate reconstructed Intra prediction residues, and the Intra prediction according to the current Intra prediction mode is applied to the reconstructed Intra prediction residues to generate the reconstructed current block.

8. The method of claim 1, wherein said one or more coding parameters comprise current block size, current block width, current block height, quantization parameter associated with the current block, or slice type associated with the current block.

9. The method of claim 1, wherein said one or more target settings correspond to the coding tool being on if the current Intra prediction mode is among a third group comprising several directional Intra prediction modes and said one or more coding parameters match a predetermined rule.

10. An apparatus for decoding or decoding video data, the apparatus comprising one or more electronic circuits or processors arranged to:
    receive a bitstream comprising compressed data corresponding to Intra prediction residues or transformed Intra prediction residues of a current block to be decoded;
    determine from the bitstream a current Intra prediction mode for the current block; and
    if the current Intra prediction mode is a directional Intra prediction mode and a coding tool that corresponds to a PDPC (Position Dependent Intra Prediction Combination) is enabled for the Intra prediction:
       determine one or more target settings for the coding tool according to the current Intra prediction mode or one or more coding parameters, the one or more target settings corresponding to indicating PDPC being on or off; and
       apply the Intra prediction and the coding tool to the Intra prediction residues or transformed Intra prediction residues to generate a reconstructed current block, wherein the Intra prediction is applied to the Intra prediction residues or transformed Intra prediction residues according to the current Intra prediction mode and the coding tool is applied to the Intra prediction according to said one or more target settings, wherein said one or more target settings correspond to PDPC being on if the current Intra prediction mode is among a first group comprising several directional Intra prediction modes and said one or more target settings correspond to PDPC being off if the current Intra prediction mode is among a second group comprising directional Intra prediction modes, wherein the first group comprising several directional Intra prediction modes is different from the second group comprising several directional Intra prediction modes.

11. A method for encoding video data, the method comprising:

receiving a current block to be encoded;

identifying a plurality of directional Intra prediction modes when the current block is predicted using Intra prediction;

identifying a coding tool enabled for the current block;

selecting a current Intra prediction mode for the current block;

if the current Intra prediction mode is one directional Intra prediction mode and the coding tool corresponds to a PDPC (Position Dependent Intra Prediction Combination) and is enabled for the Intra prediction:

determining one or more target settings for the coding tool according to the current Intra prediction mode for the current block, the one or more target settings corresponding to indicating PDPC being on or off; and applying the Intra prediction and the coding tool to the current block to generate Intra prediction residues or transformed Intra prediction residues for the current block, wherein the Intra prediction is applied to the current block according to the current Intra prediction mode and the coding tool is applied to the current block according to said one or more target settings, wherein said one or more target settings correspond to PDPC being on if the current Intra prediction mode is among a first group comprising several directional Intra prediction modes and said one or more target settings correspond to PDPC being off if the current Intra prediction mode is among a second croup comprising directional Intra prediction modes wherein the first group comprising several directional Intra prediction modes is different from the second group comprising several directional Intra prediction modes.

12. The method of claim 11, wherein said one or more target settings correspond to a flag indicating the coding tool being on or off, and wherein the flag is set to indicate the coding tool being on if the current Intra prediction mode is an even-numbered directional Intra prediction mode and the flag is set to indicate the coding tool being off if the current Intra prediction mode is an odd-numbered directional Intra prediction mode.

13. The method of claim 11, wherein said one or more target settings correspond to a flag indicating the coding tool being on or off, and wherein the flag is set to indicate the coding tool being on if the current Intra prediction mode is an odd-numbered directional Intra prediction mode and the flag is set to indicate the coding tool setting being off if the current Intra prediction mode is an even-numbered directional Intra prediction mode.

14. The method of claim 11, wherein said one or more target settings correspond to a flag indicating the coding tool being on or off, and wherein the flag is set to indicate the coding tool being on if the current Intra prediction mode is one directional Intra prediction mode belonging to a mode group consisting of a predefined number of directional Intra prediction modes and the flag is set to indicate the coding tool being off if the current Intra prediction mode is one directional Intra prediction mode not belonging to the mode group.

15. The method of claim 14, wherein the mode group is determined according to a table consisting of the predefined number of directional Intra prediction modes or according to an equation.

16. The method of claim 11, wherein PDPC coding tool generates a combined Intra predictor by combining a first Intra predictor derived based on filtered boundary reference samples with un-filtered boundary reference samples, and wherein the Intra prediction according to the current Intra prediction mode and the coding tool according to said one or more target settings are applied to the current block to generate the Intra prediction residues.

17. The method of claim 11, wherein the Intra prediction according to the current Intra prediction mode is applied to the current block to generate the Intra prediction residues and the coding tool according to said one or more target settings is applied to the Intra prediction residues to generate the transformed Intra prediction residues.

18. The method of claim 11, wherein said one or more coding parameters comprise current block size, current block width, current block height, quantization parameter associated with the current block, or slice type associated with the current block.

19. An apparatus for encoding or decoding video data, the apparatus comprising one or more electronic circuits or processors arranged to:

receive a current block to be encoded;

identify a plurality of directional Intra prediction modes when the current block is predicted using Intra prediction;

identify a coding tool enabled for the current block;

select a current Intra prediction mode for the current block;

if the current Intra prediction mode is one directional Intra prediction mode and the coding tool corresponds to a PDPC (Position Dependent Intra Prediction Combination) and is enabled for the Intra prediction:

determine one or more target settings for the coding tool according to the current Intra prediction mode for the current block, the one or more target settings corresponding to indicating PDPC being on or off; and apply the Intra prediction and the coding tool to the current block to generate prediction residues or transformed prediction residues for the current block, wherein the Intra prediction is applied to the current block according to the current Intra prediction mode and the coding tool is applied to the current block according to said one or more target settings, wherein said one or more target settings correspond to PDPC being on if the current Intra prediction mode is among a first group comprising several directional Intra prediction modes and said one or more target settings correspond to PDPC being off if the current Intra prediction mode is among a second group comprising directional Intra prediction modes, wherein the first group comprising several directional Intra prediction modes is different from the second group comprising several directional Intra prediction modes.

* * * * *